United States Patent [19]
Gronowicz, Jr. et al.

[11] Patent Number: 6,147,850
[45] Date of Patent: Nov. 14, 2000

[54] AUXILIARY POWER PORT WITH INTEGRATED RESETTABLE OVERCURRENT PROTECTION DEVICE

[75] Inventors: William Gronowicz, Jr., Westland; Brian Everett Johnson, Northville Township, both of Mich.

[73] Assignee: Yazaki Corporation, Tokyo, Japan

[21] Appl. No.: 09/212,807

[22] Filed: Dec. 16, 1998

[51] Int. Cl.[7] .................................................. H02H 5/00
[52] U.S. Cl. ...................... 361/103; 361/93.1; 361/106; 361/115
[58] Field of Search .................................. 361/93.1, 103, 361/106, 115, 58

[56] References Cited

U.S. PATENT DOCUMENTS

| | | | |
|---|---|---|---|
| 4,456,817 | 6/1984 | Mehnert et al. | 219/263 |
| 4,680,444 | 7/1987 | Skovdal et al. | 219/222 |
| 5,199,904 | 4/1993 | Wharton | 439/668 |
| 5,201,677 | 4/1993 | Takayama | 439/668 |
| 5,606,483 | 2/1997 | Sawai et al. | 361/106 |

*Primary Examiner*—Stephen W. Jackson
*Attorney, Agent, or Firm*—Young & Basile, P.C.

[57] ABSTRACT

An auxiliary power port such as is found in an automotive vehicle passenger compartment has a receptacle connected with the vehicle electrical system and a tubular, removable sleeve which fits inside the receptacle and receives a standard adapter plug of the type intended for use with automotive power ports. The exterior surface of the sleeve is covered with a layer of positive temperature coefficient (positive temperature coefficient) material, and insertion of the sleeve into the receptacle places the positive temperature coefficient layer in contact with the inner surface of the receptacle. The inner surface of the receptacle, the outer surface of the sleeve, and the positive temperature coefficient layer sandwiched therebetween form a positive temperature coefficient circuit overcurrent protection device. A number of interchangeable sleeves having different hold currents are provided for use with different electrical devices.

14 Claims, 2 Drawing Sheets

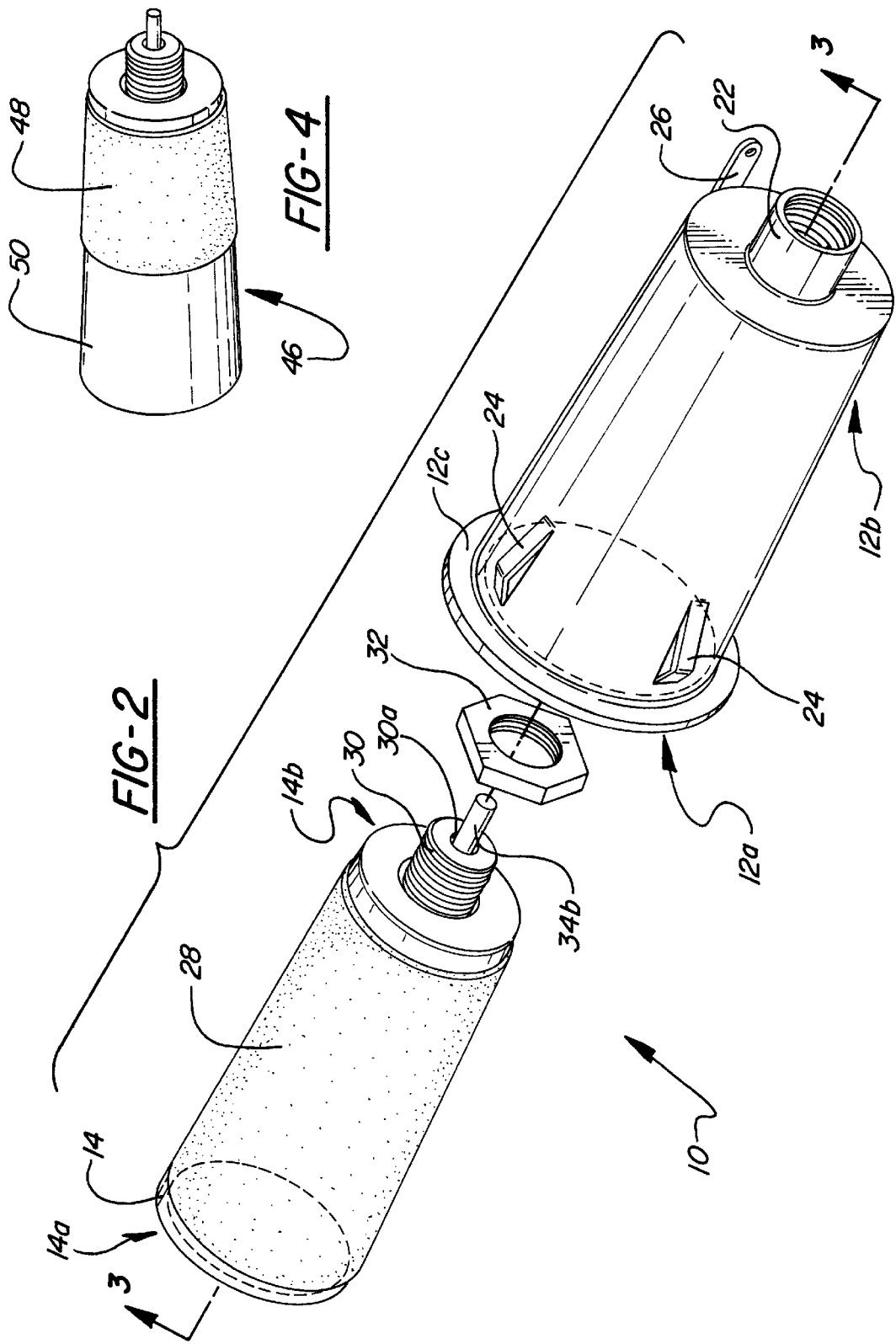

AUXILIARY POWER PORT WITH INTEGRATED RESETTABLE OVERCURRENT PROTECTION DEVICE

FIELD OF THE INVENTION

This invention relates in general to auxiliary power ports such as those employed in automotive vehicles, and more specifically to such a power port incorporating a positive temperature coefficient element to protect devices supplied with power by the port from overcurrent conditions.

BACKGROUND OF THE INVENTION

Auxiliary power ports are commonly provided in the passenger compartment of automotive vehicles to allow electrical devices such as cigarette lighters, cellular phones, radar detectors, small televisions, and the like to be connected with and receive power from the vehicle electrical system.

The automotive industry has adopted a standard size and configuration for auxiliary power ports used in vehicles. This standard configuration is a hollow, cylindrical receptacle, all or part of the interior surface of which is electrically conductive and connected to the positive or "hot" wire of a direct current circuit, and a terminal disposed at the bottom of the receptacle and connected to electrical ground. The standard adapter plug for mating with such a receptacle has a first terminal that is biased radially outward from the side of the plug to contact the interior surface of the receptacle, and a second terminal at its tip for contacting the ground terminal at the bottom of the receptacle.

The circuit of the vehicle electrical system which supplies electric power to the auxiliary power port is usually protected from overcurrent conditions by a fuse or circuit breaker which is usually located in a power distribution center or fuse block remote from the power port. The fuse or circuit breaker must be rated at a high enough amperage to permit functioning of the highest amperage electrical device which may be inserted into the power port. Consequently, any electrical device with a lower amperage rating will not be protected against overcurrent conditions, but rather may be damaged by levels of current that do not cause the fuse to blow or the circuit breaker to trip.

It is known to provide an adapter plug of an electrical device which houses a conventional cylindrical fuse having an amperage rating appropriate for the particular electrical device. An example of such an adapter plug is disclosed in U.S. Pat. No. 5,199,904. Such an adapter plug, however, may be larger than is desirable in order to house the fuse. Also, once the fuse blows the adapter plug must be partially disassembled and replaced with a spare fuse in order that the device may be used once again.

It is known to protect an electrical circuit from overcurrent conditions by making use of a positive temperature coefficient (PTC) material. Such materials exhibit an electrical resistivity which is relatively low at a design operating temperature band and increases abruptly as the temperature of the material rises beyond a critical temperature. PTC materials include compositions such as conductive polymers and ceramics.

A PTC circuit overcurrent protection device comprises a layer of PTC material sandwiched between two parallel plates of electrically conductive metal. An electrical lead is attached to each of the plates and the leads are connected to the electrical circuit. At a given operating temperature, there is a maximum steady level of electrical current which can pass from one plate to the other through the PTC material without causing significant resistance heating of the device. This level of current is dependent primarily upon the surface area of the layer of PTC material across which the current must flow in passing from one plate to the other, and is known as the "pass" or "hold" current.

Such a PTC device is designed so that when it is subjected to a level of current greater than the hold current, sufficient resistance heating of the device occurs to cause the temperature of the PTC material to climb to above the critical temperature. When this occurs, the electrical resistivity of the PTC layer becomes so great as to create what is essentially an open circuit. A very low level of current continues to pass between the metal plates, however, and this "trickle" of current may be sufficient to prevent the temperature of the device from dropping back below the critical temperature. The circuit must be broken at some other point, for example by switching off an electrical device powered by the circuit, in order for the trickle of current to cease and allow the PTC device to cool down to below its critical temperature so that the PTC material resumes its lower resistivity state. Once this occurs, the PTC circuit overcurrent protection device has essentially reset itself, without the need for any replacement or maintenance of the device, and is again able to provide protection against overcurrent conditions when the electrical device is switched back on.

SUMMARY OF THE INVENTION

Accordingly, it is an object of this invention to provide an auxiliary power port which incorporates an overcurrent protection device that is self-resetting, occupies only a small amount of space, and may be easily adjusted to provide different amperage ratings for specific devices.

In general, these objectives are achieved by an auxiliary power port comprising a receptacle which is connected with the vehicle electrical system and a tubular, removable sleeve which fits inside the receptacle and which receives an adapter plug of the type intended for use with automotive power ports. The exterior surface of the sleeve is covered with a layer of positive temperature coefficient (PTC) material, and insertion of the sleeve into the receptacle places the PTC layer in contact with the inner surface of the receptacle. The inner surface of the receptacle, the outer surface of the sleeve, and the PTC layer sandwiched therebetween form a PTC circuit overcurrent protection device.

In a preferred embodiment of the invention, the inner surface of the receptacle and the outer surface of the sleeve are both conical in shape, having substantially identical and shallow taper angles so that when the sleeve is urged into the receptacle there is a "wedging" effect which generates a normal force urging the outer surface of the PTC layer firmly into contact with the inner surface of the receptacle to ensure good electrical contact therebetween.

According to another feature of the invention, the sleeve and the receptacle have cooperating threaded elements so that the sleeve may be screwed downwardly into the receptacle to hold it in position and maintain adequate normal force between the PTC layer and the inner surface of the receptacle. In a preferred embodiment of the invention, the threaded elements are located at the lower ends of the receptacle and the sleeve, adjacent a terminal for making electrical connection with a contact at the tip of the adapter plug.

According to another feature of the invention, the power port includes two or more interchangeable sleeves, each of which has a different hold current. The hold current of a sleeve may be adjusted by varying the amount and/or the type of PTC material applied thereto. Providing a number of sleeves with varying hold currents allows the sleeve having the correct amperage rating for the particular electrical device to be selected and inserted into the receptacle prior to insertion of the adapter plug. In this way, the amperage rating of the circuit protection for the power port may be conveniently changed to provide the correct amperage level of protection for the particular device being used.

BRIEF DESCRIPTION OF THE DRAWINGS

FIG. 2 is an exploded perspective view of the auxiliary power port of FIG. 1;

FIG. 4 is a perspective view of a second sleeve that may be used interchangeably with the first sleeve.

DETAILED DESCRIPTION OF THE PREFERRED EMBODIMENT

Figure 1:
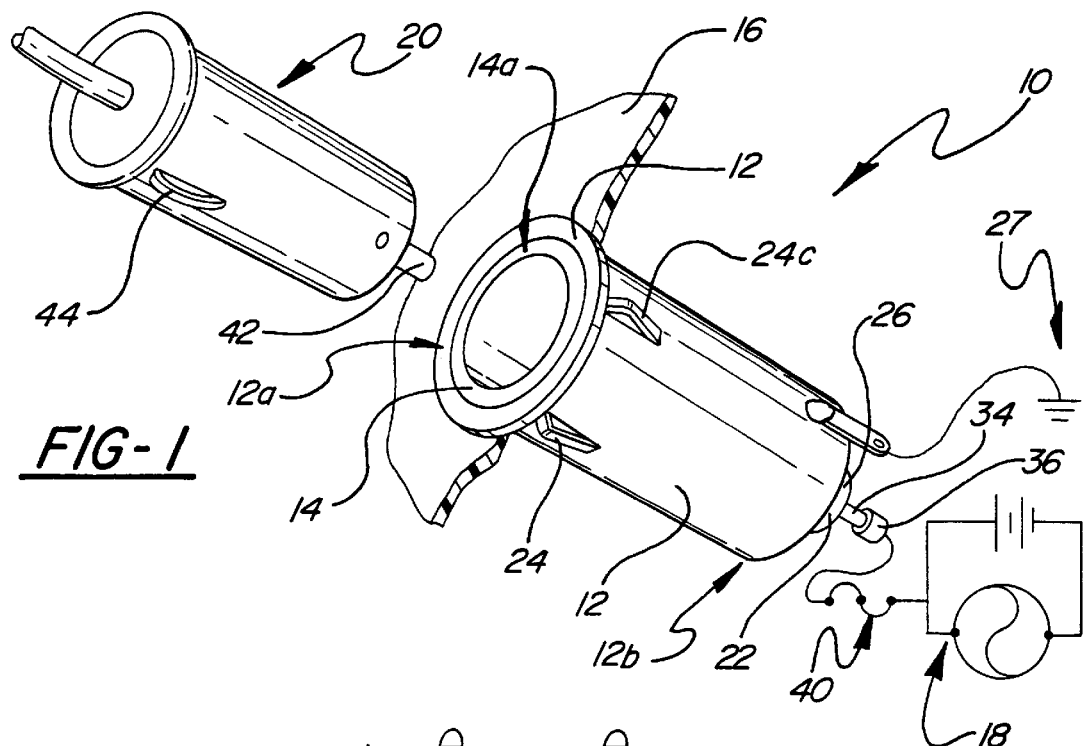
FIG. 1 is a perspective view of an auxiliary power port according to the present invention installed in a vehicle and an electrical device adapter plug with its attached cord.
Figure 3:
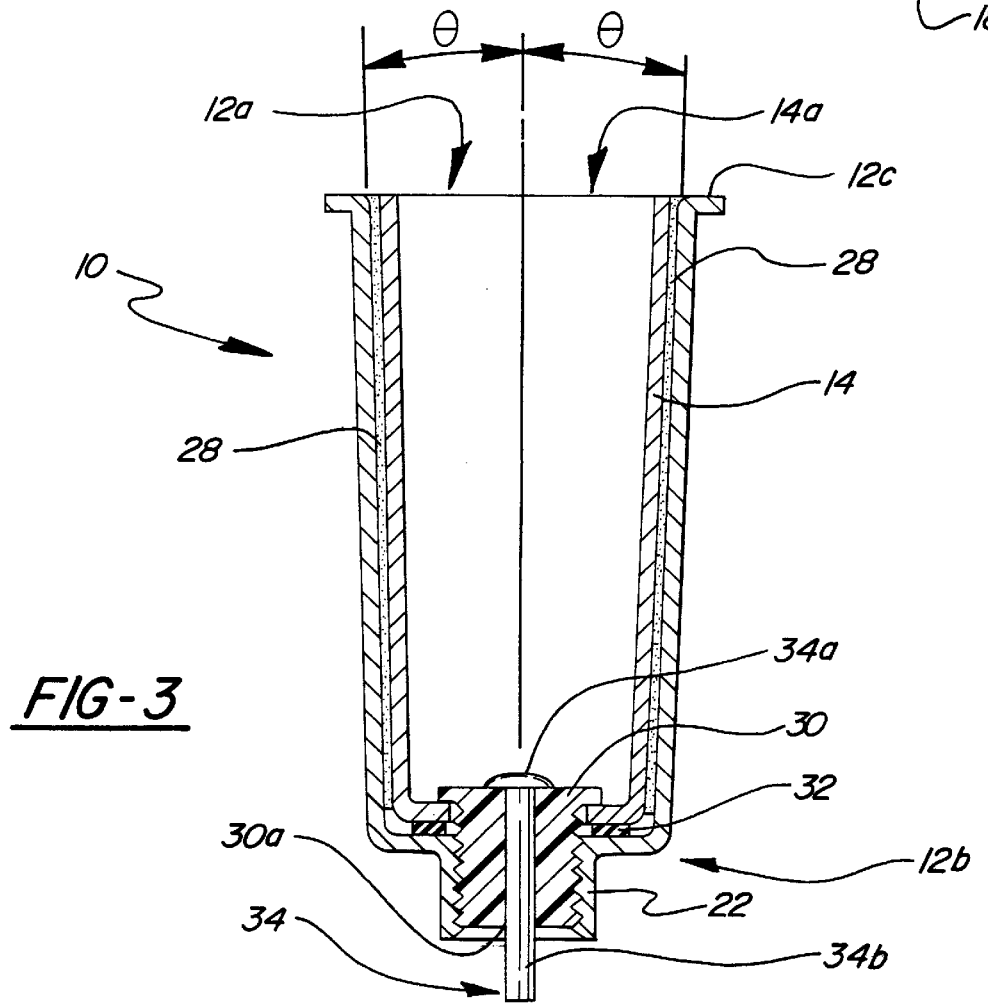
FIG. 3 is a cross sectional view taken along line 3—3 of FIG. 2, showing the sleeve inserted into the receptacle.

Referring now to FIGS. 1–3, an auxiliary power port 10 according the present invention is seen to include a receptacle 12 and a tubular sleeve 14 which is removably insertable into the receptacle. The receptacle 12 is adapted for installation, in the conventionally known manner, flush with a panel 16 within the vehicle passenger compartment, and is connected with the vehicle electrical system 18. The sleeve 14 is of the correct interior diameter and length to receive a standard adapter plug 20 of an electrical device such as a cellular phone, radar detector, or light (not shown).

The receptacle 12 comprises a tubular barrel having an open upper end 12a and a closed lower end 12b, a mounting rim 12c projecting radially outward from the upper end of the barrel, and an internally threaded projection 22 extending axially from the lower end. One or more spring clips 24 project radially outwardly from the receptacle 12 to aid in retaining the receptacle 12 within an opening in the panel 16 in which it is mounted, and may be formed integrally with the barrel by a stamping procedure. A connection tab 26 extends from the lower end of the receptacle 12 to provide a point for connecting the receptacle 12 with electrical ground 27. The receptacle 12 is formed from an electrically conductive metal. The outer surface of the receptacle 12 may be coated with or otherwise enclosed by an electrically insulating material if necessary to reduce the likelihood of electrical shorting when the receptacle 12 is installed in the vehicle.

As is best seen in FIG. 3, the inner surface of the receptacle 12 is conical in shape, having a very shallow taper angle θ, such that it is wider at its open end than at its lower end. The taper angle θ preferably lies in the range of from 1° to 4°.

The sleeve 14 comprises a thin tube of electrically conductive metal having an open upper end 14a and a closed lower end 14b. It also is conical in shape, having a taper angle θ equal to that of the receptacle 12. All or a portion of the exterior surface of the sleeve 14 is covered by a thin layer of positive temperature coefficient (PTC) material 28. An externally threaded stud 30 formed from an electrically insulative material such as plastic extends axially from the lower end of the sleeve 14 and has a hole 30a passing through its central axis. An electrically insulative nut 32 is threaded over the stud 30 to contact the lower surface of the sleeve 14 and so retain the stud on the sleeve. A terminal pin 34 has a head 34a disposed atop the stud 30 at the bottom of the sleeve 14 and a shaft 34b extending downwardly through the hole 30a such that its lower end extends beyond the lower end of the stud.

The receptacle 12 is installed in the vehicle such that the connection tab 26 is in contact with electrical ground 27 (see FIG. 1). The sleeve 14 is then inserted into the interior of the receptacle 12 such that the threaded stud 30 meets the mating threaded projection 22 at the bottom of the receptacle 12, and the sleeve is rotated relative to the receptacle to screw the sleeve 14 downwardly into the receptacle until the sleeve is wedged within the receptacle due to the conical shapes of the components. As the sleeve 14 is screwed downwardly into the receptacle 12, the terminal pin 34 projects through the threaded projection 22 at the bottom of the receptacle 12 and makes contact with a mating terminal 36 disposed within the mounting position in the vehicle to connect the receptacle 12 with the vehicle electrical system 18.

As the sleeve 14 is screwed down tightly into the receptacle 12, the wedging engagement between the sleeve and receptacle urges the outer surface of the PTC layer 28 into contact with the interior surface of the receptacle to ensure good electrical contact therebetween so that electric current can flow from the receptacle and through the PTC layer to the sleeve 14. The PTC material 28 is electrically conductive when at a normal operating temperature, but "trips" to a non-conductive state if the temperature of the PTC material reaches a critical level as is caused if the level of current flowing through the PTC material exceeds the designed hold current of the PTC device. The fuse or circuit breaker 40 associated with the vehicle electrical system 18 is rated at a higher amperage than the PTC hold current, so it does not blow or trip, but rather continues to protect the system in case of a direct short.

To use an electrical device with the power port 10, its adapter plug 20 is pushed into the receptacle assembly such that an end contact 42 at the tip of the plug presses against the terminal pin head 34a and a spring contact 44 on the side of the plug 20 is urged against the inner surface of the sleeve 14.

FIG. 4 depicts a second sleeve 46 having a hold current lower than that of the first sleeve 14 and usable interchangeably with the first sleeve. The second sleeve 46 is generally similar in configuration to the first sleeve 14, except that it has a layer of PTC material 48 covering only the lower portion of the tube. A thin layer of electrically insulating material 50, such as mylar, surrounds the sleeve 46 adjacent its open end to prevent direct electrical contact between the sleeve and the receptacle 12. A solid ring of insulating material could be used in place of the mylar layer.

The second sleeve 46 is used interchangeably with the first sleeve 14 and is inserted into the receptacle 12 for electrical connection therewith in the same manner as the first sleeve described hereinabove. Because it has a smaller area of contact between the PTC material 48 and the inner surface of the receptacle 12, the second sleeve 46 has a lower hold current; that is, it will "trip" to prevent passage of electrical current at a lower amperage than the first sleeve 14.

Additional sleeves having different hold currents may be provided and are usable interchangeably with one another such that the power port 10 may be adapted to provide overcurrent protection at the current level required for the particular electrical device being powered by the port. The hold current of a sleeve may also be adjusted by using a different PTC material having a different resistivity.

It is also possible to vary the effective hold current of a sleeve having PTC material covering substantially the entire outer surface thereof, such as sleeve 14 disclosed hereinabove. This may be accomplished by covering a portion of the outer surface of the PTC material 28 with an electrically insulative layer prior to inserting the sleeve into the receptacle 12. For example, a tube of mylar may be slid over the sleeve 14 to cover the upper half of the PTC layer 28. This reduces by one half the surface area of contact between the PTC material and the inner surface of the receptacle 12 when the sleeve 14 is inserted therein, and thus reduces the hold current by one half.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A power port for connecting a plug of an electrical device to an electrical circuit, the power port comprising:
    a receptacle having means for making electrical connection with the circuit;
    a sleeve for receiving the plug therein and removably insertable into the receptacle; and
    a layer of positive temperature coefficient material sandwiched between an outer surface of the sleeve and an inner surface of the receptacle to conduct electrical current therebetween under normal circuit conditions and to substantially block said electrical current when the overcurrent condition occurs.

2. A power port according to claim 1 wherein the positive temperature coefficient layer is disposed on the outer surface of the sleeve such that the sleeve and the positive temperature coefficient layer are removable from the receptacle as a unit.

3. A power port according to claim 1 wherein the outer surface of the sleeve and the inner surface of the receptacle are cones having matching taper angles, whereby urging of the sleeve into the receptacle along an axis common to the cones urges the positive temperature coefficient layer into contact with the inner and outer surfaces.

4. A power port according to claim 3 further comprising means for urging the sleeve into the receptacle to thereby urge the positive temperature coefficient layer into contact with the inner and outer surfaces.

5. A power port according to claim 4 wherein the urging means comprises matingly engagable threaded means on the sleeve and on the receptacle such that rotation of the sleeve relative to the receptacle draws the sleeve into the receptacle.

6. A power port according to claim 2 further comprising a second sleeve interchangeable with the first sleeve, the second sleeve having a second positive temperature coefficient layer disposed on an outer surface thereof, the second positive temperature coefficient layer providing a level of overcurrent protection different from that of the first positive temperature coefficient layer.

7. A power port according to claim 1 wherein the means for making electrical connection with the circuit comprises a terminal disposed at a bottom end of the receptacle.

8. A power port for supplying electrical power from a circuit to an electrical device having a plug, the power port comprising:
    a receptacle having a conical inner surface and means for making connection with the circuit;
    a sleeve having a hollow interior for receiving the plug and a conical outer surface having a taper angle substantially matching a taper angle of the receptacle inner surface; and
    a layer of positive temperature coefficient material disposed on the outer surface of the sleeve, whereby insertion of the sleeve into the receptacle places the positive temperature coefficient layer in contact with the inner surface of the receptacle.

9. A power port according to claim 8 further comprising means for urging the sleeve into the receptacle to thereby urge the positive temperature coefficient layer into contact with the receptacle inner surface.

10. A power port according to claim 9 wherein the urging means comprises a threaded element adjacent a lower end of the sleeve for engagement with a second threaded element adjacent a lower end of the receptacle such that rotation of the sleeve relative to the receptacle draws the sleeve into the receptacle.

11. A power port according to claim 8 wherein the means for making connection with the circuit comprises a terminal disposed at a bottom end of the receptacle.

12. A power port according to claim 8 further comprising a second sleeve interchangeable with the first sleeve, the second sleeve having a second positive temperature coefficient layer disposed on an outer surface thereof, the second positive temperature coefficient layer providing a level of overcurrent protection different from that of the first positive temperature coefficient layer.

13. A sleeve for providing protection against overcurrent conditions in a circuit providing electrical power to a receptacle for receiving a plug of an electrical device, the sleeve comprising:
    an electrically conductive tube having an interior for receiving the plug: and
    a layer of positive temperature coefficient material disposed on an outer surface of the tube, the tube insertable into the receptacle to sandwich the positive temperature coefficient layer between the tube and an interior surface of the receptacle.

14. A sleeve according to claim 13 wherein the outer surface of the tube is a cone, whereby insertion of the sleeve into a receptacle having an interior surface in the shape of a cone wedges the positive temperature coefficient layer between the outer surface of the tube and the interior surface of the receptacle.

* * * * *